United States Patent
Lin

(10) Patent No.: US 12,438,429 B2
(45) Date of Patent: Oct. 7, 2025

(54) 4-STATOR-POLE STEP MOTOR WITH PASSIVE INTER-POLES

(71) Applicant: Lin Engineering, Inc., Morgan Hill, CA (US)

(72) Inventor: Ted T. Lin, Saratoga, CA (US)

(73) Assignee: Lin Engineering, Inc., Morgan Hill, CA (US)

( * ) Notice: Subject to any disclaimer, the term of this patent is extended or adjusted under 35 U.S.C. 154(b) by 290 days.

(21) Appl. No.: 18/112,487

(22) Filed: Feb. 21, 2023

(65) Prior Publication Data

US 2023/0208267 A1 Jun. 29, 2023

Related U.S. Application Data

(62) Division of application No. 17/329,296, filed on May 25, 2021, now Pat. No. 11,621,623.

(60) Provisional application No. 63/138,150, filed on Jan. 15, 2021.

(51) Int. Cl.
*H02K 37/14* (2006.01)

(52) U.S. Cl.
CPC ................................. *H02K 37/14* (2013.01)

(58) Field of Classification Search
CPC ........ H02K 37/14; H02K 37/12; H02K 37/10; H02K 37/04; H02K 1/146; H02K 1/16; H02K 1/165; H02K 1/27; H02K 1/2733; H02K 1/2753; H02K 1/278; H02K 1/2787
See application file for complete search history.

(56) References Cited

U.S. PATENT DOCUMENTS

| | | | |
|---|---|---|---|
| 2,825,830 A | 3/1958 | Davis | |
| 4,031,419 A | 6/1977 | Spiesberger et al. | |
| 4,672,253 A * | 6/1987 | Tajima | H02K 29/03 |
| | | | 310/156.01 |
| 5,196,775 A * | 3/1993 | Harris | H02P 25/089 |
| | | | 318/638 |

(Continued)

FOREIGN PATENT DOCUMENTS

| | | | |
|---|---|---|---|
| JP | 2005117731 A | * | 4/2005 |
| JP | 2010130818 A | | 6/2020 |
| WO | WO2016173293 A1 | | 11/2016 |

OTHER PUBLICATIONS

Machine translation of JP-2005117731-A. (Year: 2005).*

(Continued)

*Primary Examiner* — Michael Andrews
(74) *Attorney, Agent, or Firm* — Mark Protsik; Thomas Schneck

(57) ABSTRACT

A two-phase bipolar step motor, comprises a rotor having a plurality of pairs of rotor poles of alternating magnetic polarity, and a stator having four primary energizable stator poles with conductive windings around those primary stator poles and four passive inter-poles located uniformly between every adjacent pair of primary stator poles, the passive inter-poles lacking any conductive windings. Both 18° steppers with five pairs of rotor poles and 30° steppers with three pairs of rotor poles are provided. Also provided are both PM hybrid mix steppers with 2D magnetic flux paths and hybrid steppers with 3D magnetic flux paths having an axial component. In each case, the overall lengths of the flux paths are substantially reduced from conventional designs resulting in improved motor efficiency.

7 Claims, 15 Drawing Sheets

(56) References Cited

U.S. PATENT DOCUMENTS

| | | | |
|---|---|---|---|
| 5,289,064 | A | 2/1994 | Sakamoto |
| 5,874,795 | A * | 2/1999 | Sakamoto ............... H02K 3/28 |
| | | | 310/179 |
| 6,329,736 | B1 | 12/2001 | Bernauer et al. |
| 6,481,090 | B1 | 11/2002 | Franco et al. |
| 9,013,083 | B2 | 4/2015 | Morita et al. |
| 9,112,386 | B2 | 8/2015 | Roopnarine |
| 2007/0013237 | A1 | 1/2007 | Badgerow et al. |
| 2012/0074797 | A1 * | 3/2012 | Petter ................. H02K 21/16 |
| | | | 29/598 |
| 2012/0104905 | A1 * | 5/2012 | Prudham .............. H02K 29/03 |
| | | | 310/68 B |
| 2013/0249331 | A1 | 9/2013 | Yoshida et al. |
| 2013/0342065 | A1 | 12/2013 | Horizumi et al. |
| 2016/0079838 | A1 * | 3/2016 | Yoda .................... H02K 37/10 |
| | | | 310/49.01 |
| 2017/0149322 | A1 | 5/2017 | Lin et al. |
| 2018/0166948 | A1 | 6/2018 | Ogawa et al. |
| 2018/0269763 | A1 * | 9/2018 | Lin ....................... H02K 1/146 |
| 2019/0036399 | A1 * | 1/2019 | Yamada ................. H02K 3/28 |
| 2020/0153298 | A1 | 5/2020 | Takahashi et al. |

OTHER PUBLICATIONS

Article: Islam et al., "Issues in reducing the cogging torque of mass-produced permanent-magnet brushless DC motor", IEEE Transactions on Industry Applications, vol. 40, No. 3, May/Jun. 2004, 8 pages.
WO 2016173293 A, english translation, 9 pages.
JP 2010130818 A, english translation, 20 pages.
JP 2005117731 A, english translation, 10 pages.

* cited by examiner

4-STATOR-POLE STEP MOTOR WITH PASSIVE INTER-POLES

CROSS-REFERENCE TO RELATED APPLICATION

This application is a divisional application of U.S. patent application Ser. No. 17/329,296, filed on May 25, 2021 which claims priority under 35 U.S.C. 119(e) from U.S. Provisional Application 63/138,150, filed Jan. 15, 2021.

TECHNICAL FIELD

The invention relates generally to motors wherein a rotor driven by a stator rotates step-by-step between successive detent positions, i.e., stepping motors, and more specifically to stepping motors with a four-stator-pole design with large fundamental step angles, such as 18° and 30° steppers, with particular emphasis on increasing motor efficiency.

BACKGROUND ART

A wide range of motor applications, including the orienting of communication devices, surveillance cameras, and stage lighting, need only relatively low directional resolution, but require adequate dynamic and holding torque from the motors to be able to reorient such equipment at a useful speed. 18° permanent magnet (PM) type stepping motors are frequently used for this purpose because of their speed and torque performance. However, improved motor designs that increase motor speed and reduce motor noise while maintaining high torque are continually being sought.

Efficient hybrid stepper motors in the industry are designed having eight stator poles. The most efficient hybrid stepper is an 8-pole stator design with multiple teeth per pole. However, their typically small stepping angle (e.g., 1.8°) is much too fine for high-speed applications. The 4-stator-pole hybrid stepper is a low efficient design due to the long magnetic flux paths. In both hybrid and permanent magnet (PM) type stepping motors, as well as hybrid PM mix steppers, existing 4-pole stator designs result in a low efficient stepper due mainly to a long magnetic flux path. Additionally, in hybrid PM mix steppers there are severe flux leakages from the magnet pole aligned with the primary stator pole to the two adjacent magnet poles. Poor magnetic flux utilization tends to produce steppers with inadequate holding torque for the types of motor applications mentioned above.

To illustrate this, FIGS. 1 through 3 show a conventional design of an 18° hybrid PM mix stepper. This motor has a central rotor 11 with ten permanent magnet strips 13 of equal circumferential width arranged axially around the circumference of the rotor's core 12 with the magnetic polarity of each magnet facing radially outward. Five N magnetic rotor poles alternate with five S magnetic rotor poles. The motor also has a stator 15 with four salient stator poles 16-19 that project radially inwardly from a magnetically permeable armature yoke 20 and that terminate on their inner ends in corresponding stator shoes 21-24. The stator shoes interface with the rotor poles across an air gap of uniform radial width. The shoes also serve to hold conductive windings in place around the respective stator poles 16-19. All four stator poles 16-19 have windings 25-28, but for purpose of illustration are shown only for those poles that are energized in any specific drive phase. In FIG. 1, only the phase-A coils 25 and 27 around poles 16 and 18 are energized with drive current through the windings, a one-phase ON condition, to produce an electromagnetic flux along closed loop paths 31 and 32. In FIG. 2, both the phase-A coils 25 and 27 around poles 16 and 18 and the phase-B coils 26 and 28 around poles 17 and 19 are energized with drive current through the windings, a two-phase ON condition, to produce magnetic flux paths 33 and 34. In FIG. 3, only the phase-B coils 26 and 28 around poles 17 and 19 are energized with drive current through the windings, another one-phase ON condition, to produce magnetic flux paths 35 and 36. (Please note that the relatively minor fluxes from each of the individual rotor permanent magnets are not shown; only the more dominant flux paths generated from the energized stator poles are shown.) These three motor drive phases are representative of the eight possible one-phase ON and two-phase ON conditions of this bipolar stepper, where the others can be created with drive current through windings of one or both of the phase-A and phase-B stator poles flowing in an opposite direction.

As seen from the magnetic fluxes 31-36 generated by the energized stator poles, all the various possible drive phase conditions are characterized as having long magnetic flux paths. In the one-phase ON conditions represented by FIGS. 1 and 3, the flux paths 31-32 and 35-36 extend 180° around the armature yoke 20. Even in the two-phase ON conditions represented by FIG. 2, the flux paths 33-34 still extend 90° around the armature yoke 20. As a result, the magnet flux utilization is very poor, resulting in low performance.

It is very desirable therefore to improve the efficiency of 4-stator-pole stepper motors above current performance levels. Specific applications include reorienting equipment such as surveillance cameras, stage lighting and communication devices at useful speeds.

SUMMARY DISCLOSURE

A two-phase bipolar step motor is provided that significantly shortens the magnetic flux paths in all drive phases by providing four dummy inter-poles in addition to the four primary energizable stator poles. The motor includes a rotor having a plurality of rotor poles in pairs of alternating N and S magnetic polarity. The stator has four primary stator poles terminating at their innermost ends in stator shoes and with conductive windings around those stator poles, and four dummy inter-poles located uniformly between every adjacent pair of primary stator poles. The dummy inter-poles lack any conductive windings and typically lack pole shoes. Both the primary stator poles and the dummy inter-poles are radially spaced from the rotor by a narrow air gap that is identical for all primary stator poles and dummy inter-poles. The four dummy inter-poles may have a circumferential dimension or arcuate width that is a factor in a range from 0.6 to 0.8 of a circumferential dimension of the four primary stator poles. The magnetic flux paths created by the primary energized stator poles pass from those stator poles to return through adjacent dummy inter-poles creating much shorter paths than the conventional design.

Two typical examples are an 18° stepper and a 30° stepper. They both have four primary energizable stator poles and have improved performance with the addition of the four dummy inter-poles. In the 18° stepper, there are five pairs of N and S rotor poles with a rotor tooth pitch of 72°. The motor is characterized by a full step of 18° between successive one-phase ON detent positions and by a half step of 9° between one-phase ON and two-phase ON detent positions. In the 30° stepper, there are three pairs of N and S rotor poles with a rotor tooth pitch of 120°. The motor is characterized by a full step of 30° between successive one-phase ON detent positions and by a half step of 15° between one-phase ON and two-phase ON detent positions.

These step motors can have either a PM rotor or a hybrid rotor. In the hybrid PM mix stepper, the rotor poles are in the form of axially oriented strips of permanent magnets arranged circumferentially around a cylindrical rotor core. The permanent magnets have alternating N and S magnetic poles facing radially outward. In the hybrid stepper, the rotor is the form of a pair of magnetically permeable rotor sections sandwiching a permanent magnet disk with magnetic poles facing axially such that the two rotor sections receive opposite magnetic polarities. Each rotor section has a set of salient rotor teeth projecting radially outward, the teeth in one rotor section being circumferentially offset from the teeth in the other rotor section by one-half tooth pitch so that the teeth define the rotor poles.

Adding the four inter-poles between the four primary energizable stator poles will shorten the flux paths both in the one-phase ON and two-phase ON drive conditions relative to the prior conventional design, improving motor efficiency. Additionally, the use of the inter-poles will minimize flux leakage in the hybrid PM mix steppers. The invention fully utilizes the magnetic flux on the rotor to develop maximum torque.

DETAILED DESCRIPTION

Figure 1:
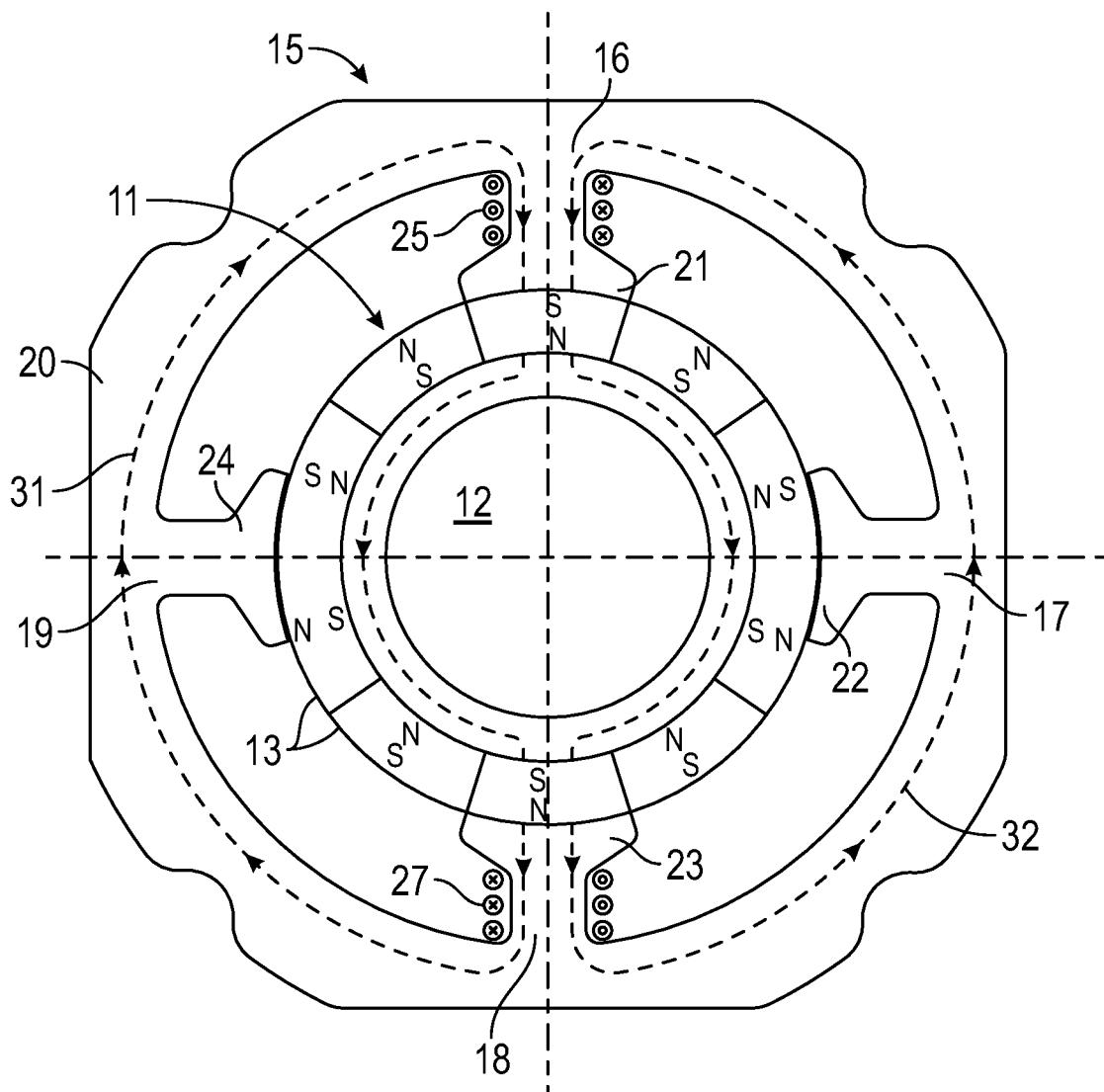
FIGS. 1 through 3 are respective schematic axial plan views of a conventional 18° hybrid PM mix stepper of the prior art for respective A-phase ON, AB-phase ON and B-phase ON drive conditions, with rotor at respective 0° full step, 9° half step, and 18° full step positions.
Figure 2:
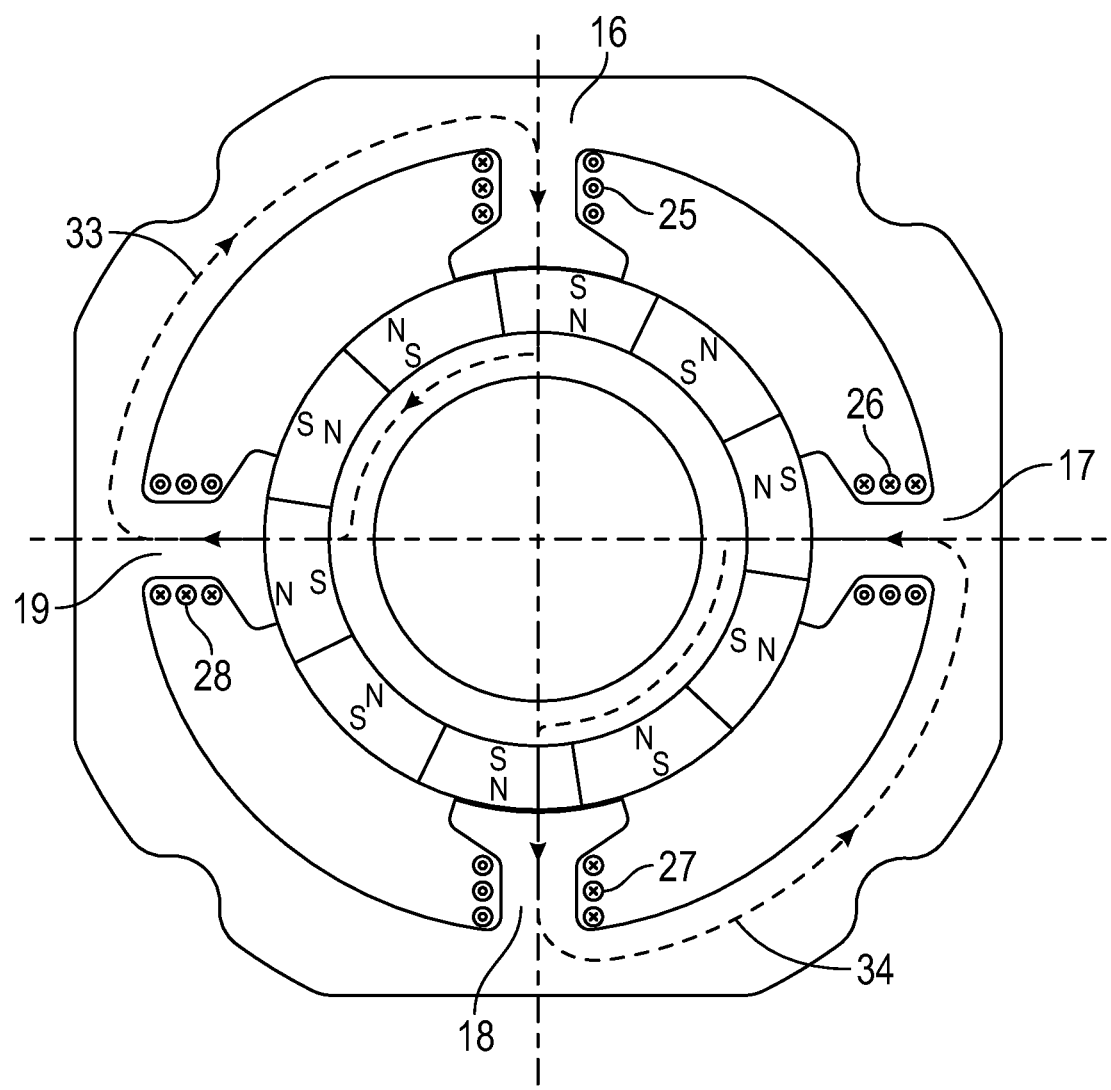
Figure 3:
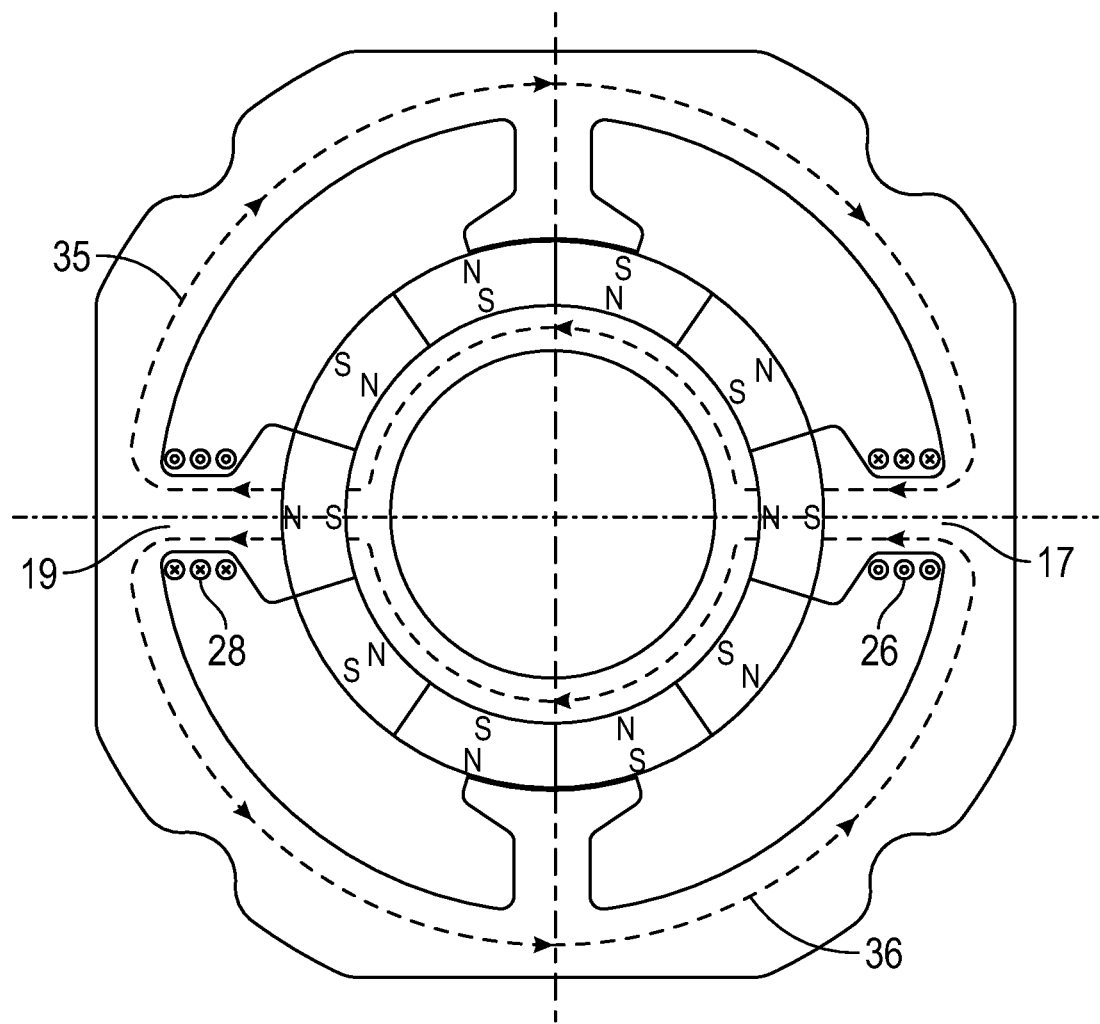
Figure 4:
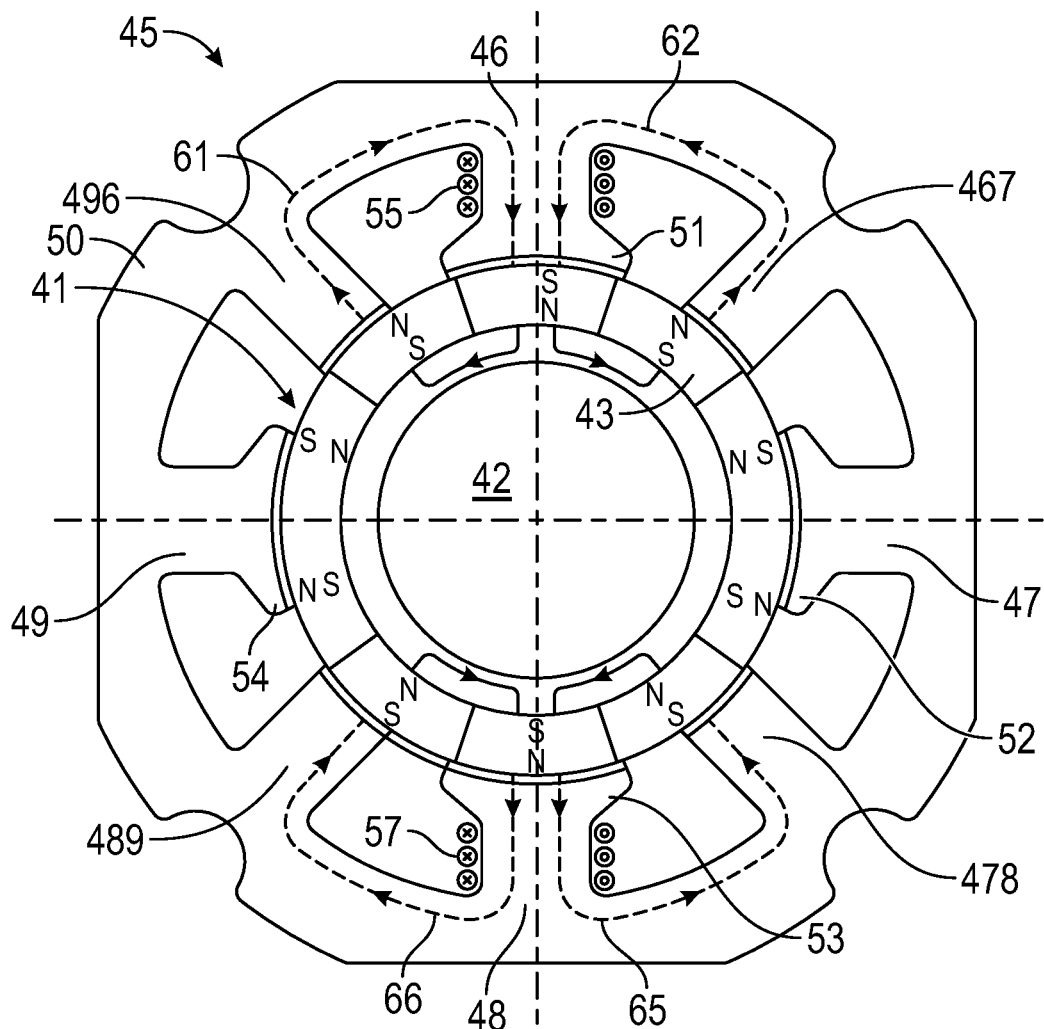
FIGS. 4 through 6 are respective schematic axial plan views of a first 18° hybrid PM mix stepper embodiment in accord with the present invention for respective A-phase ON, AB-phase ON and B-phase ON drive conditions, with rotor at respective 0° full step, 9° half step, and 18° full step positions.
Figure 5:
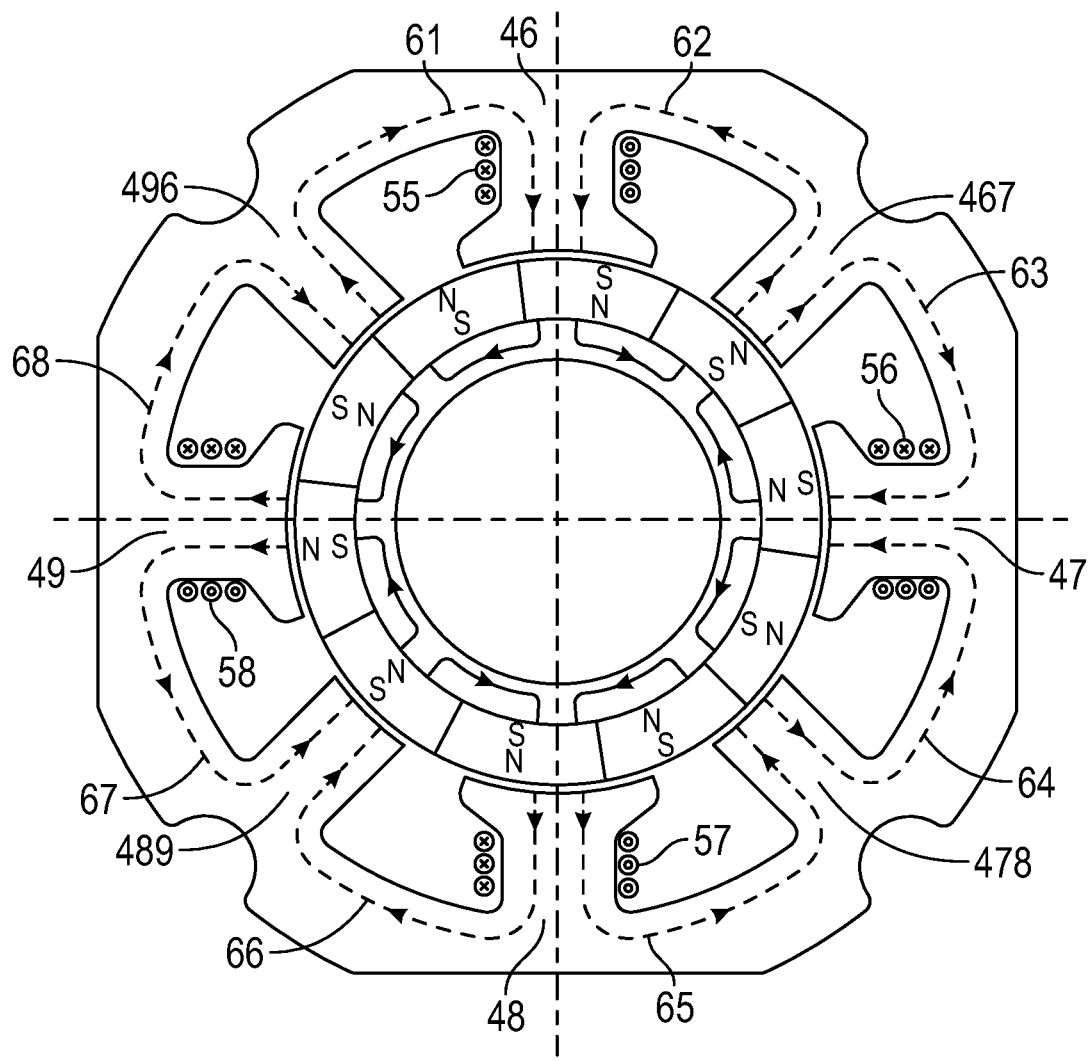
Figure 6:
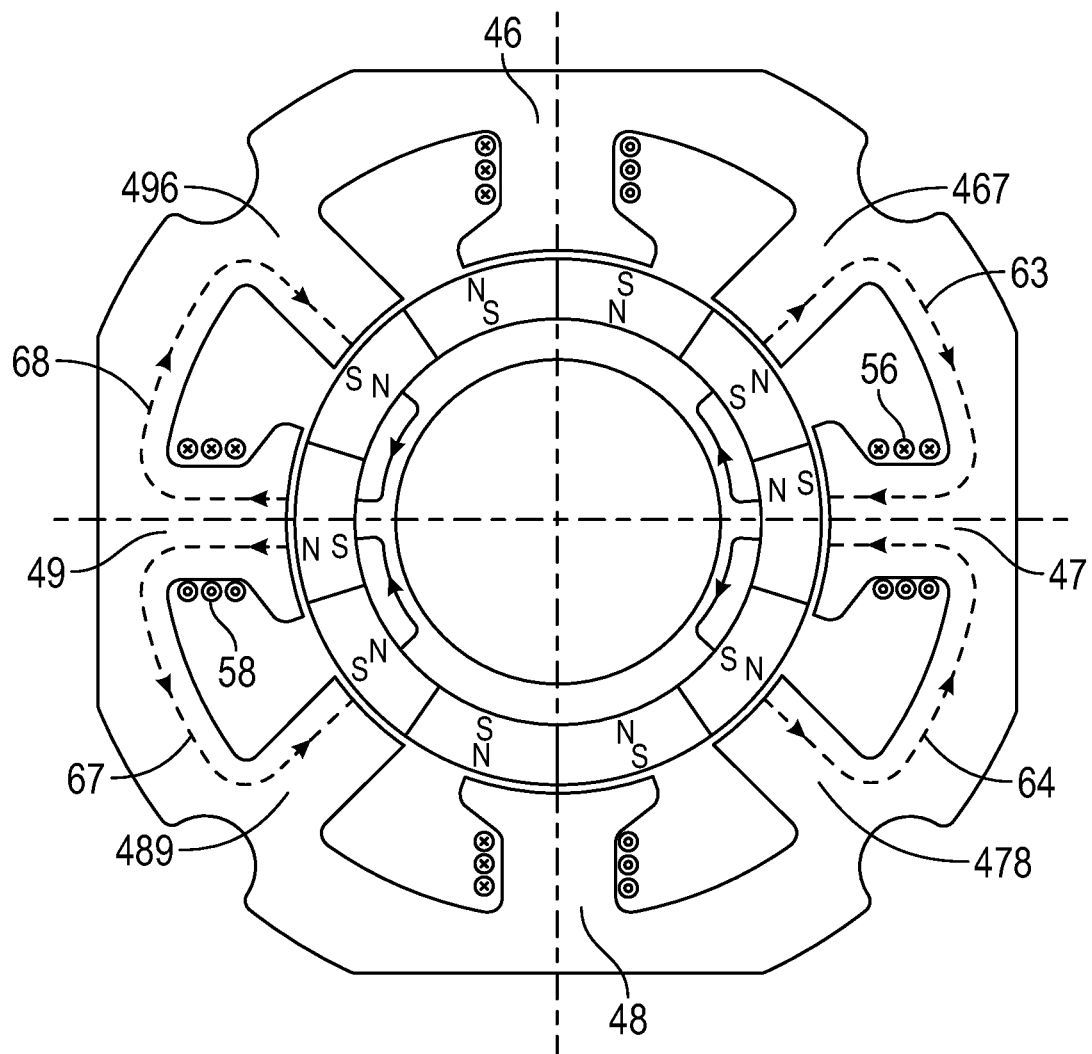

With reference to FIGS. 4-6, an 18° hybrid-PM mix step motor, representative of the invention, is seen in respective A-phase ON, AB-phase ON and B-phase ON conditions, which are three of the eight full-step and half-step drive phases of the motor. The other drive phases are comparable but with one or both drive current directions reversed, as is well known in the art. The one phase ON conditions (A+, B+, A−, and B−) are the full step positions separated by 18° rotations of the rotor. The various two phase ON conditions (A+B+, A−B+, A−B−, and A+B−) are offset by a half-step rotation of 9° from the full step positions. A micro-stepping mode of operation is also possible, where the A and B stator pole windings receive various amounts of drive current less than the full amplitude, so that the rotor is in positions between the full-step and half-step positions.

All the hybrid-PM mix steppers (both the one illustrated in FIGS. 4-6 and another shown in FIGS. 10-12), may have their rotor poles in the form of axially oriented strips of permanent magnets arranged circumferentially around a cylindrical rotor core, the permanent magnets having magnetic poles that face radially outward. The magnetic flux paths with this type of rotor are two-dimensional (2D) with substantially no axial component, but only radial and circumferential components.

The 18° step motor in FIGS. 4-6 (also a different type of 18° step motor in FIGS. 7-9) has a rotor with five (5) pairs of rotor poles, ten in total, which alternate in N and S polarity around the rotor's circumference. The rotor pitch angle for the magnetic pole pairs is 72°.

In FIGS. 4-6, the rotor 41 has a rotor core 42 with permanent magnet rotor poles 43. The step motor also comprises a stator 45 with a set of four energizable stator poles 46-49 projecting radially inward from a magnetically permeable stator armature yoke 50. These energizable stator poles 46-49 terminate at their radially innermost ends with stator pole shoes 51-54 that extend circumferentially from the poles 46-49. The pole shoes expand the magnetic interaction between the stator and rotor and serve to physically hold conductive stator windings 55-58 around the poles 46-49. (Note that in each of the embodiments, including that shown in FIGS. 4-6, there are windings around all four energizable stator poles having shoes, but for illustration purposes only those that receive drive current in a particular drive phase are shown in each figure. Thus, for the A-phase ON condition in FIG. 4, only windings 55 and 57 are shown, for the B-phase ON condition in FIG. 6, only the windings 56 and 58, and for the AB-phase ON condition in FIG. 5, all the windings 55-58 are shown. The same is true for the other embodiments illustrated.)

Specific to step motors that accord with the present invention, the stator 45 also has as set of four passive interpoles 467, 478, 489, and 496 that also project radially inward from the stator armature yoke 50 in positions situated circumferentially equidistant between the energizable stator poles. The passive or dummy interpoles completely lack any windings and typically lack pole shoes as well. The interpoles are not energizable in any drive phase, but simply function to accept return magnetic flux via the rotor to complete the magnetic circuit in a much shorter path than previously possible for four-stator-pole step motors.

Magnetic flux paths 61-68 (shown as dashed lines) form closed loops that proceed from the energized stator poles of each drive phase. The magnetic flux crosses the radial air gap between pole shoes and rotor and return through a passive interpole to the stator. In FIG. 4, it is seen that the energized stator pole 46 generates a N magnetic pole at its pole shoe 51 that passes across the air gap to the corresponding S magnetic pole face of a rotor permanent magnet pole 43. Two magnetic flux loops 61 and 62 are created that pass in opposite directions to the adjacent rotor permanent magnet pole 53 of opposite polarity then return across the air gap to respective passive interpoles 496 and 467. The magnetic circuit of each flux loop 61 and 62 is completed through the armature yoke 50. Likewise, the energized stator pole 48 generates a S magnetic pole at its pole shoe 53 that interacts across the air gap with a corresponding N facing permanent magnet rotor pole 43 which again proceeds in opposite directions to adjacent rotor poles 43 before returning across the air gap to respective passive interpoles 478 and 489 and reconnecting with the stator pole 48 via the armature yoke 50, thereby completing magnetic flux loops 65 and 66. The resulting flux paths are shortened by about one-half over the conventional design to improve motor efficiency. Similarly, in FIG. 5 in the half-stepped (the rotor has moved 9°) phase-AB energized condition (two-phase ON) the flux paths 61-68 are significantly shortened by about one-fourth of the conventional design, and in FIG. 6 in the full-stepped B-phase ON condition (one-phase ON, like FIG. 4) the flux paths 63, 64, 67 and 68 are shortened by half from the conventional design.

Figure 7:
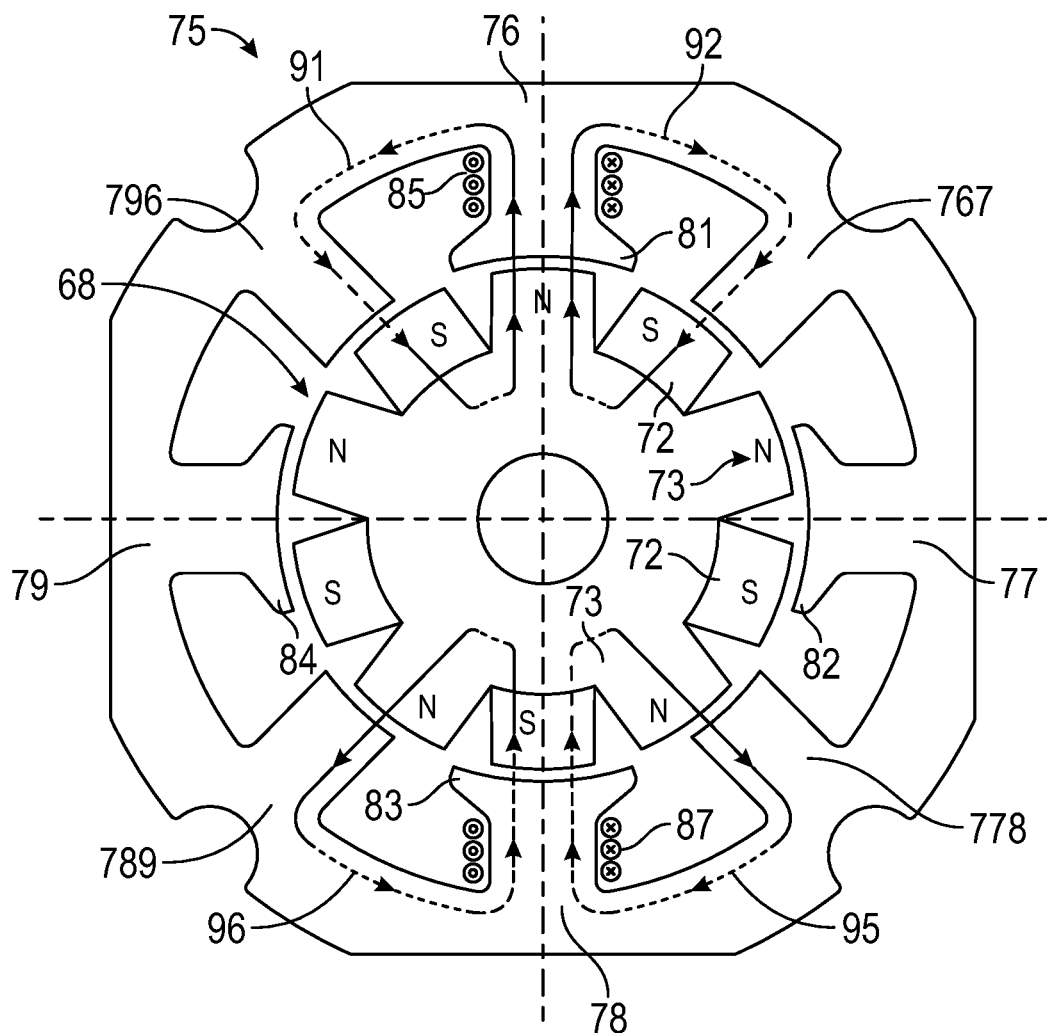
FIGS. 7 through 9 are respective schematic axial plan views of a second 18° hybrid stepper embodiment in accord with the present invention for respective A-phase ON, AB-phase ON and B-phase ON drive conditions, with rotor at respective 0° full step, 9° half step, and 18° full step positions.
Figure 8:
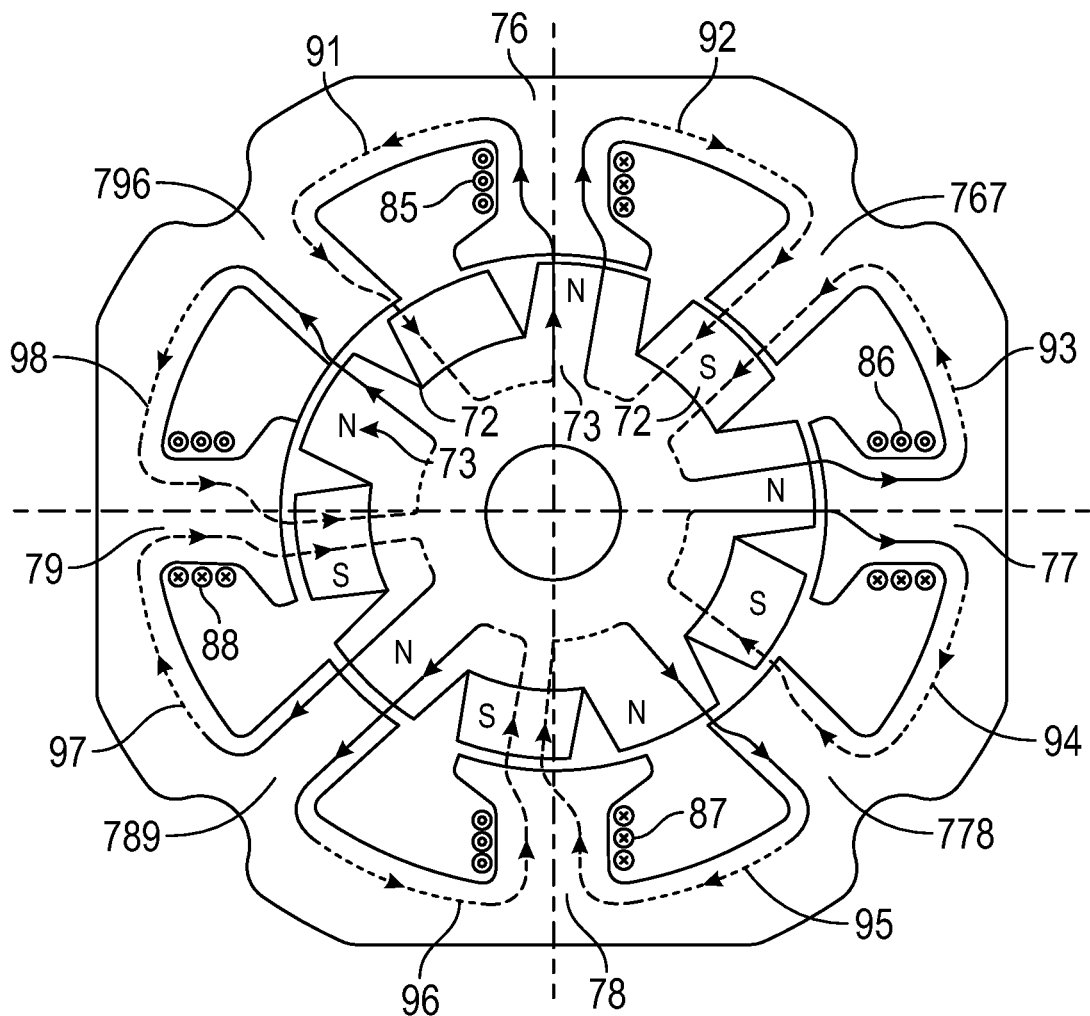
Figure 9:
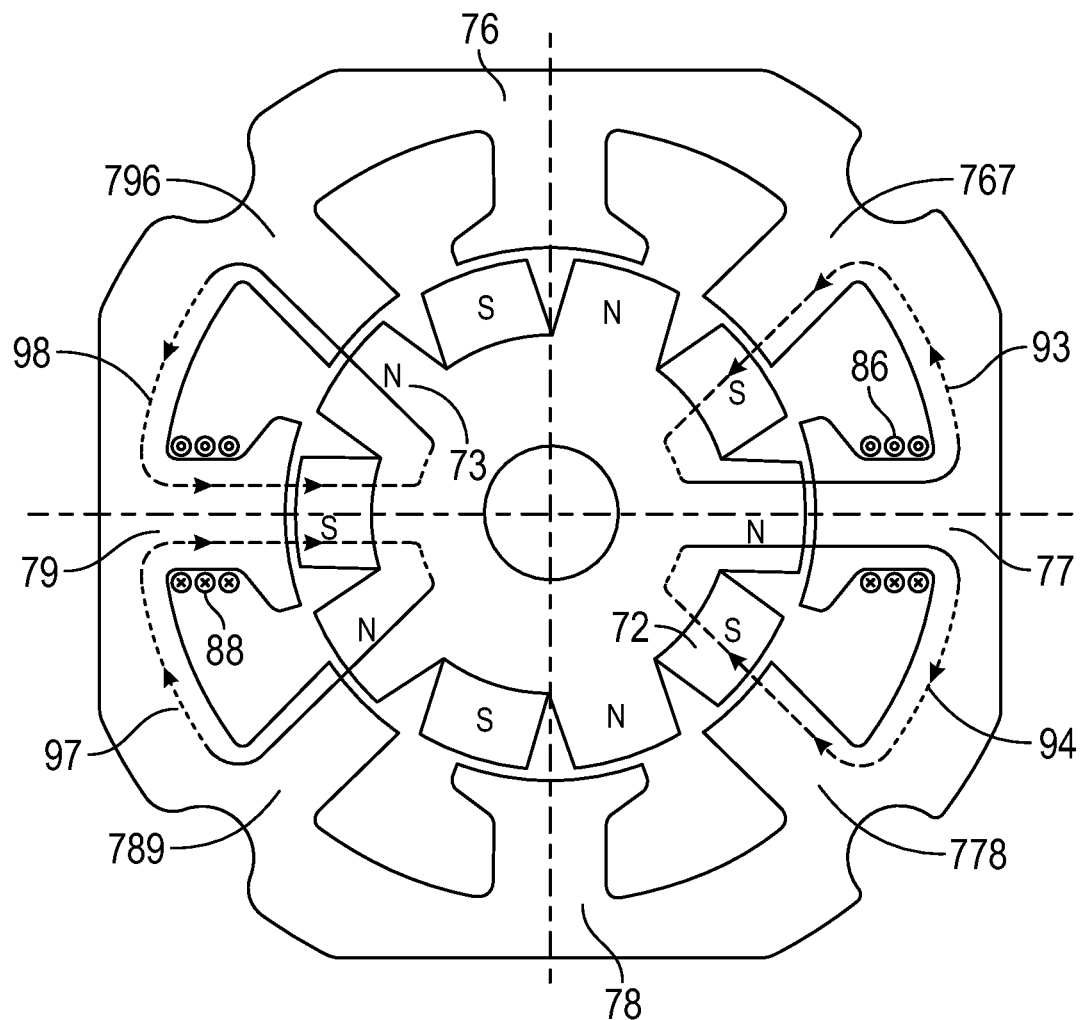

FIGS. 7-9 demonstrate the energized magnetic flux paths of a Hybrid rotor with the interpole design. In the hybrid stepper, the rotor 71 is the form of a pair of magnetically permeable rotor sections sandwiching a permanent magnet disk with magnetic poles facing axially such that the two rotor sections receive opposite magnetic polarities. Each rotor section has a set of salient rotor teeth projecting radially outward, the teeth in one rotor section being circumferentially offset from the teeth in the other rotor section by one-half tooth pitch so that the teeth define the rotor poles. Here, the rotor teeth 72 in the rearmost rotor section in this vantage point are seen to present a South magnetic polarity toward the stator 75 and the rotor teeth 73 in the forwardmost rotor section are seen to present a North magnetic polarity toward the stator 75. Since the magnetic flux in a Hybrid rotor design is a 3-dimensional path with axial components, the bold lines represent the flux path on the upper section of the magnet, the dashed lines represent the flux path on the lower section of the magnet, and the dotted lines represent the flux path on the diagonal lines either from the upper section to the lower section or from the lower section to the upper section. As in FIGS. 4-6 in this 18° stepper there are five N and five S rotor poles circumferentially alternating every 36° with a tooth pitch (both N and S rotor poles) of 72°.

The step motor also comprises a stator 75 with a set of four energizable stator poles 76-79 projecting radially inward from a magnetically permeable stator armature yoke 80. These energizable stator poles 76-79 terminate at their radially innermost ends with stator pole shoes 81-84 that extend circumferentially from the poles 76-79. The pole shoes expand the magnetic interaction between the stator and rotor and serve to physically hold conductive stator windings 85-88 around the poles 76-79. (Note that in FIGS. 7-9, as before, there are windings around all four energizable stator poles having shoes, but for illustration purposes only those that receive drive current in a particular drive phase are shown in each figure. Thus, for the A-phase ON condition in FIG. 7, only windings 85 and 87 are shown, for the B-phase ON condition in FIG. 9, only the windings 86 and 88, and for the AB-phase ON condition in FIG. 8, all the windings 85-88 are shown. The same is true for the other embodiments illustrated.)

Specific to step motors that accord with the present invention, the stator 75 also has as set of four passive interpoles 767, 778, 789, and 796 that also project radially inward from the stator armature yoke 80 in positions situated circumferentially equidistant between the energizable stator poles. The passive or dummy interpoles completely lack any windings and typically lack pole shoes as well. The interpoles are not energizable in any drive phase, but simply function to accept return magnetic flux via the rotor to complete the magnetic circuit in a much shorter path than previously possible for four-stator-pole step motors.

Again, it can be seen that the magnetic flux paths 91-98 in each of the various one-phase ON (phase-A in FIG. 7 and phase-B in FIG. 9) and two-phase ON (phase-AB in FIG. 8) conditions are reduced in circumferential extent from conventional designs for improved motor efficiency, although for a hybrid stepper, the length of the axial components of the path are unchanged.

Figure 10:
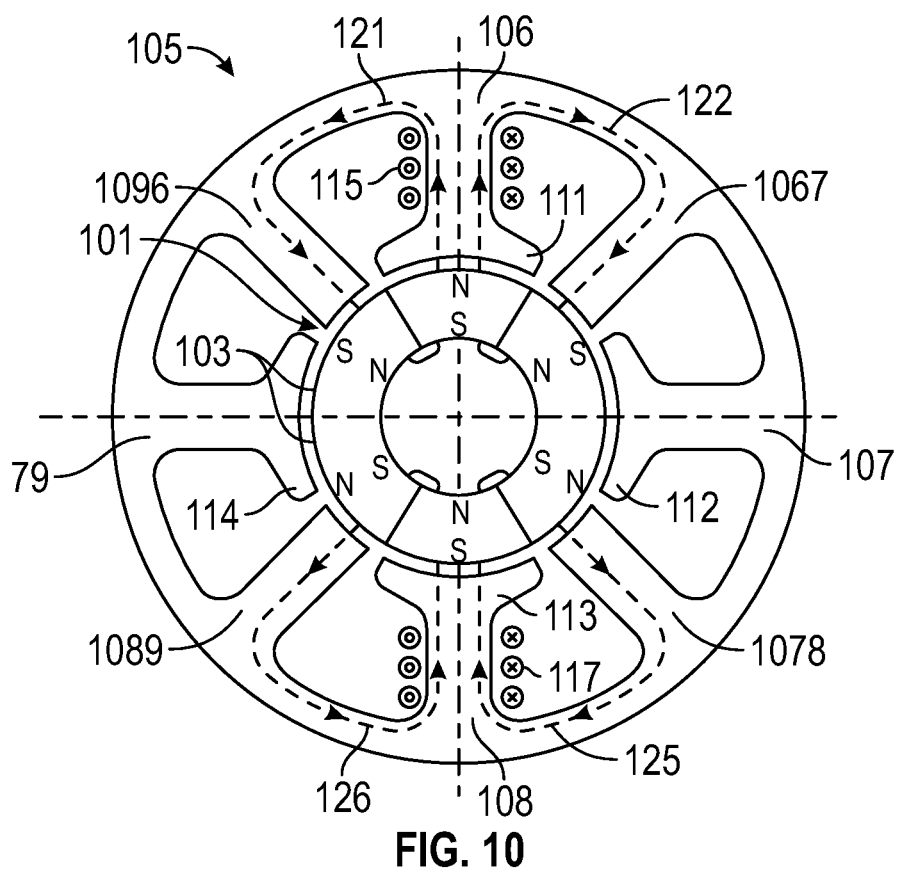
FIGS. 10 through 12 are respective schematic axial plan views of a third 30° hybrid PM mix stepper embodiment in accord with the present invention for respective A-phase ON, AB-phase ON and B-phase ON drive conditions, with rotor at respective 0° full step, 15° half step, and 30° full step positions.
Figure 11:
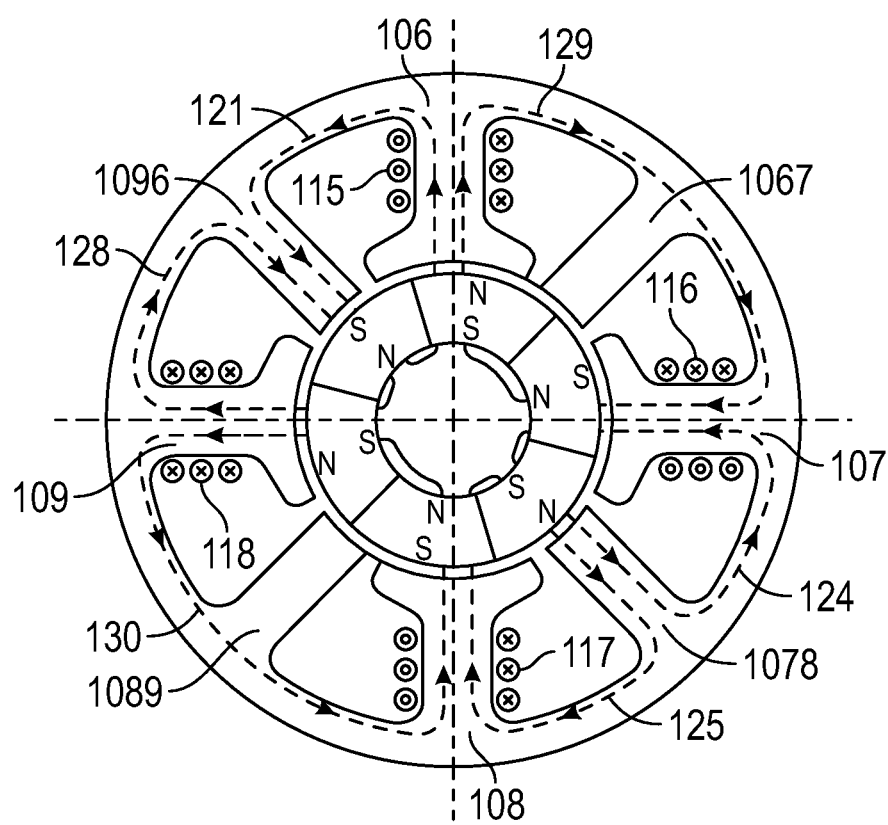
Figure 12:
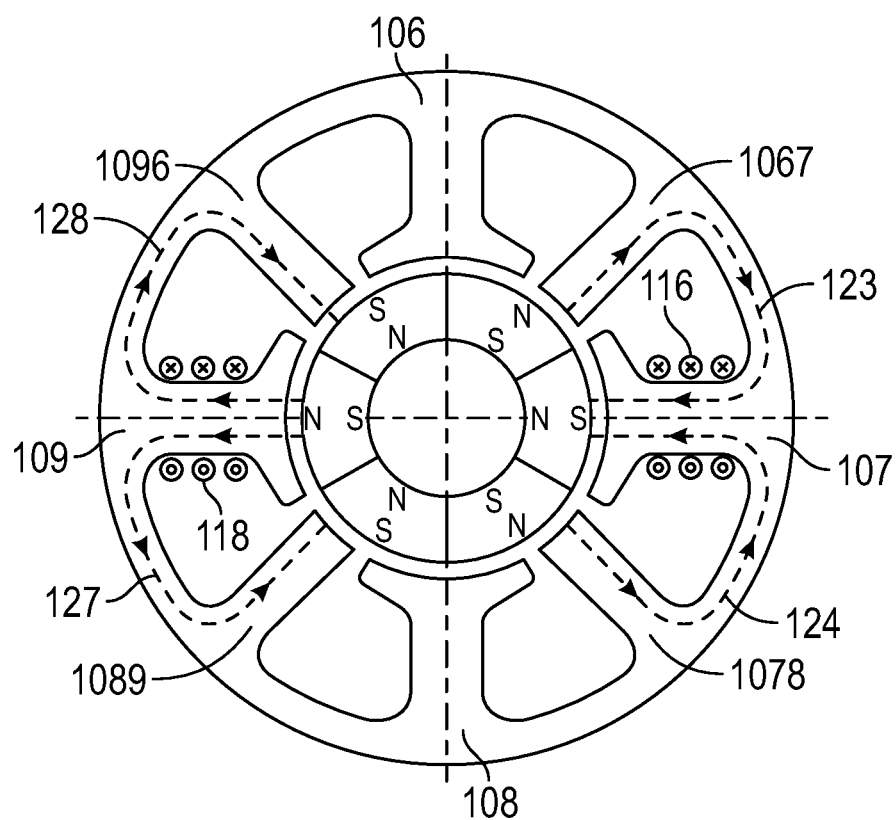

In yet another embodiment of the invention, seen in FIGS. 10-12, a 30° step motor has a rotor pitch angle=120° with three (3) magnetic pole pairs, 3 N & 3 S rotor poles and a stator with the addition of 4 interpole dummy poles inserted between the primary 4 stator poles to carry the magnetic flux. The rotor 101 has a rotor core 102 with permanent magnet rotor poles 103. The step motor includes a stator 105 with a set of four energizable stator poles 106-109 projecting radially inward from a magnetically permeable stator armature yoke 110. These energizable stator poles 106-109 terminate at their radially innermost ends with stator pole shoes 111-114 that extend circumferentially from the poles 106-109. The pole shoes expand the magnetic interaction between the stator and rotor and serve to physically hold conductive stator windings 115-118 around the poles 106-109.

Again, the stator 105 has as set of four passive interpoles 1067, 1078, 1089, and 1096 that also project radially inward from the stator armature yoke 110 in positions situated circumferentially equidistant between the energizable stator poles. The passive or dummy interpoles completely lack any windings and typically lack pole shoes as well. The interpoles are not energizable in any drive phase, but simply function to accept return magnetic flux via the rotor to complete the magnetic circuit in a much shorter path than previously possible for four-stator-pole step motors. As a result, it can be seen that the magnetic flux paths 121-130 in each of the various one-phase ON (phase-A in FIG. 10 and phase-B in FIG. 12) and two-phase ON (phase-AB in FIG. 11) conditions are reduced in circumferential extent from conventional designs for improved motor efficiency. However, for the 30° stepper with only 3 pairs of rotor poles, but four energizable stator poles and four passive interpoles, the two-phase ON condition looks a little different with both 45° radial flux paths 121, 124, 125 and 128 and 90° radial flux paths 129 and 130. Nevertheless, the extent of the flux paths is still significantly reduced over conventional designs, resulting in much better magnetic flux utilization and improved stepper motor efficiency.

Figure 13:
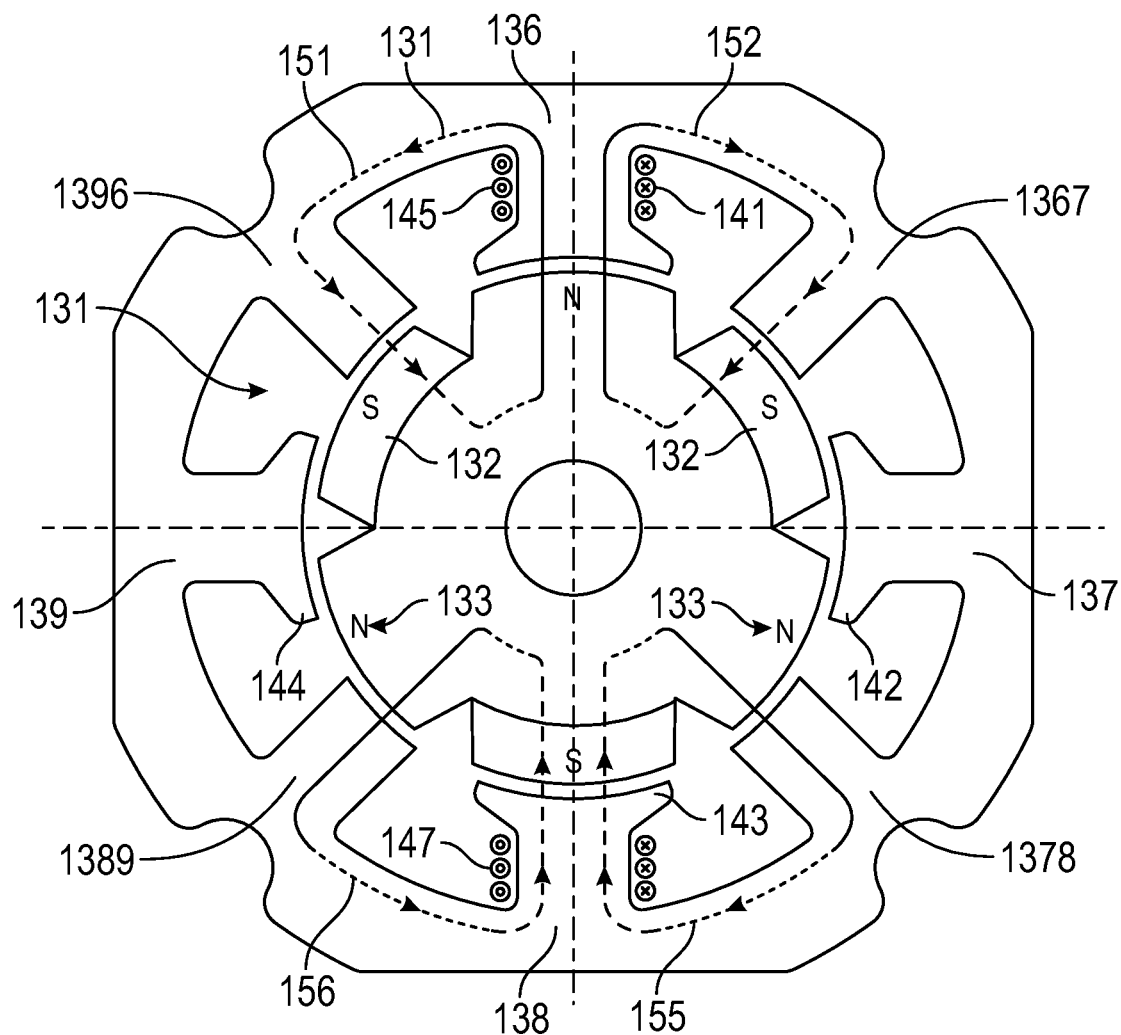
FIGS. 13 through 15 are respective schematic axial plan views of a fourth 30° hybrid stepper embodiment in accord with the present invention for respective A-phase ON, AB-phase ON and B-phase ON drive conditions, with rotor at respective 0° full step, 15° half step, and 30° full step positions.
Figure 14:
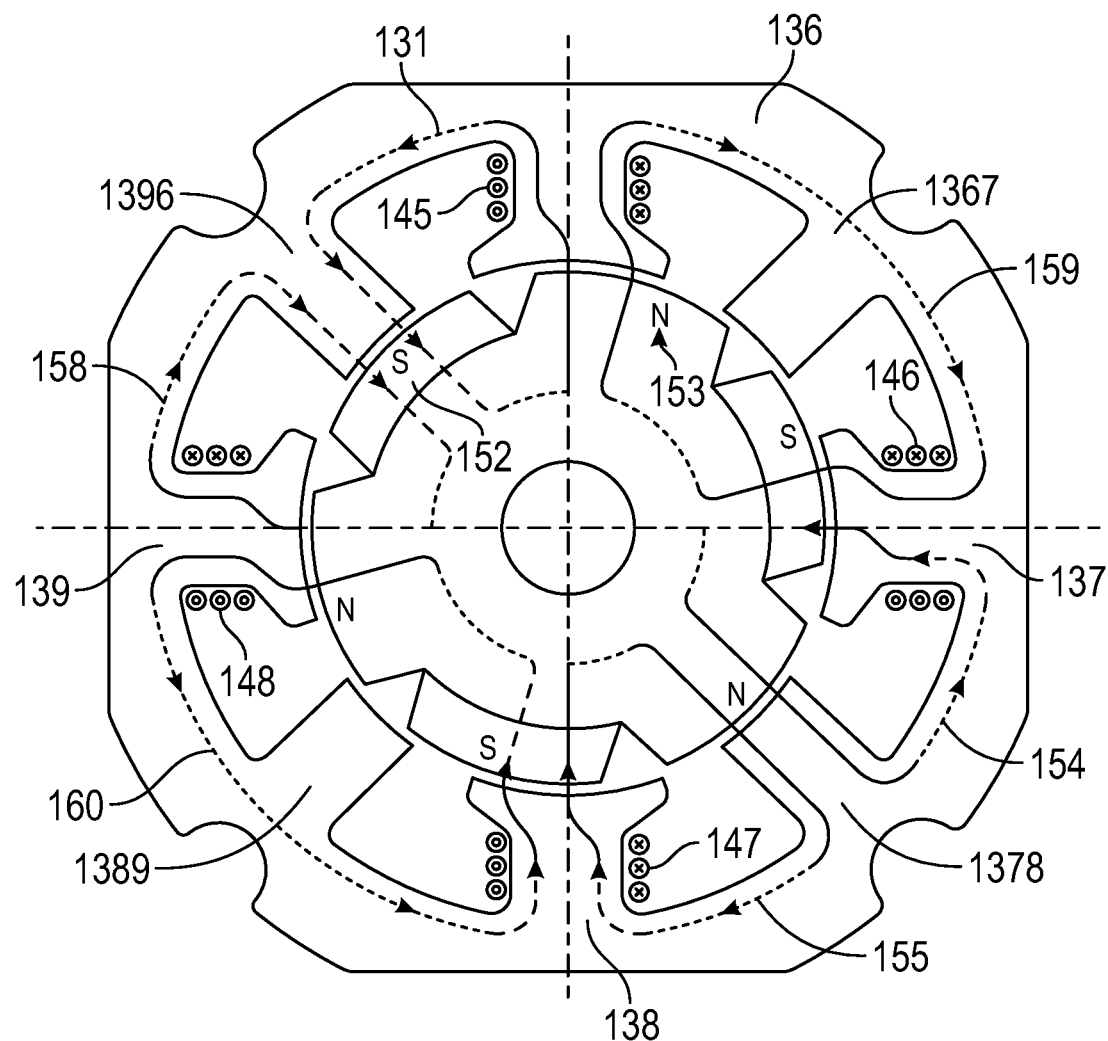
Figure 15:
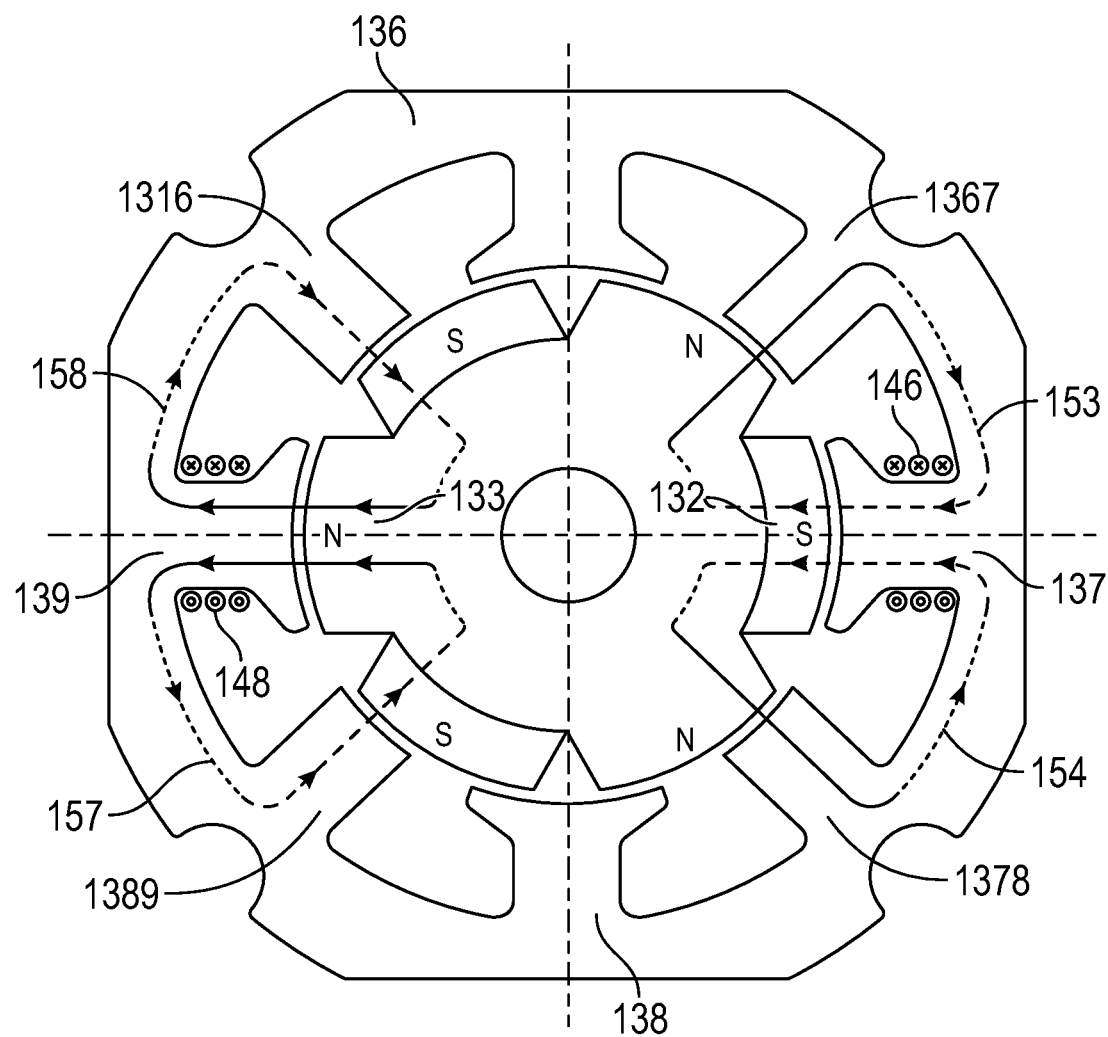

Finally, FIGS. 13-15 demonstrate the energized magnetic flux paths of a Hybrid rotor 131 with the interpole design for a 30° Hybrid step motor. Again, there are three pairs of rotor poles 132 and 133 of alternating magnetic polarity, but like the hybrid stepper in FIGS. 7-9 it has its N rotor poles 133 in one rotor section axially forward of the S rotor poles 132 in a rearward rotor section (from the vantage point of the figures), resulting in three-dimensional magnetic flux paths 151-160.

The step motor includes a stator 135 with a set of four energizable stator poles 136-139 projecting radially inward from a magnetically permeable stator armature yoke 140. These energizable stator poles 106-139 terminate at their radially innermost ends with stator pole shoes 141-144 that extend circumferentially from the poles 136-139. The pole shoes expand the magnetic interaction between the stator and rotor and serve to physically hold conductive stator windings 145-148 around the poles 136-139. Again, the stator 135 has as set of four passive interpoles 1367, 1378, 1389, and 1396 that also project radially inward from the stator armature yoke 110 in positions situated circumferentially equidistant between the energizable stator poles. The passive or dummy interpoles completely lack any windings and typically lack pole shoes as well. The interpoles are not energizable in any drive phase, but simply function to accept return magnetic flux via the rotor to complete the magnetic circuit in a much shorter path than previously possible for four-stator-pole step motors.

As in FIGS. 10-12, it can be seen in FIGS. 13-15 that the magnetic flux paths 151-160 in each of the various one-phase ON (phase-A in FIG. 13 and phase-B in FIG. 15) and two-phase ON (phase-AB in FIG. 14) conditions are reduced in circumferential extent from conventional designs for improved motor efficiency. However, for the 30° stepper with only 3 pairs of rotor poles, but four energizable stator poles and four passive interpoles, the two-phase ON condition looks a little different with both 45° radial flux paths 151, 154, 155 and 158 and 90° radial flux paths 159 and 160. As in the hybrid stepper of FIGS. 7-9, the axial component of the magnetic flux paths are largely unchanged. But because the reduction their radial extent, the overall length of the flux paths is still significantly reduced over conventional designs, resulting in much better magnetic flux utilization and improved stepper motor efficiency.

The invention claimed is:

1. A two-phase bipolar step motor, comprising:
a permanently magnetized rotor having a plurality of pairs of rotor poles of alternating magnetic polarity; and
a stator having four primary stator poles with conductive windings around those primary stator poles and four dummy inter-poles located uniformly between every adjacent pair of primary stator poles, the dummy inter-poles lacking any conductive windings,
wherein there are three pairs of rotor poles with a rotor pitch angle of 120°, the motor characterized by a full step of 30° between successive one phase ON detent positions and by a half step of 15° between one-phase ON and two-phase ON detent positions.

2. The step motor as in claim 1, wherein the rotor poles are in the form of axially oriented strips of permanent magnets arranged circumferentially around a cylindrical rotor core, the permanent magnets having magnetic poles facing radially outward.

3. The step motor as in claim 1, wherein the rotor is the form of a pair of magnetically permeable rotor sections sandwiching a permanent magnet disk with magnetic poles facing radially such that the two rotor sections receive opposite magnetic polarities, each rotor section having a set of salient rotor teeth projecting radially outward, the teeth in one rotor section being circumferentially offset from the teeth in the other rotor section by one-half tooth pitch so that the teeth define the rotor poles.

4. The step motor as in claim 1, wherein the four primary stator poles with windings terminate in stator shoes while the four dummy inter-poles lack stator shoes, both the primary stator poles and the dummy inter-poles being radially spaced from the rotor by a narrow air gap that is identical for all primary stator poles and dummy inter-poles.

5. The step motor as in claim 1, the four dummy interpoles have a circumferential dimension that is a factor in a range from 0.6 to 0.8 of a circumferential dimension of the four primary stator poles.

6. A two-phase bipolar hybrid PM mix step motor, comprising:
a rotor having a plurality of pairs of rotor poles of alternating magnetic polarity, the rotor poles being in the form of axially oriented strips of permanent magnets arranged circumferentially around a cylindrical rotor core, the permanent magnets having magnetic poles facing radially outward; and
a stator having four energizable stator poles terminating in stator shoes and with conductive windings around those energizable stator poles, and four passive inter-poles located uniformly between every adjacent pair of primary stator poles, the passive inter-poles lacking stator shoes and lacking any conductive windings,
wherein there are three pairs of rotor poles with a rotor pitch angle of 120°, the motor characterized by a full step of 30° between successive one phase ON detent positions and by a half step of 15° between one-phase ON and two-phase ON detent positions.

7. A two-phase bipolar hybrid step motor, comprising:
a rotor having a plurality of pairs of rotor poles of alternating magnetic polarity, the rotor poles being in the form of a pair of magnetically permeable rotor sections sandwiching a permanent magnet disk with magnetic poles facing radially such that the two rotor sections receive opposite magnetic polarities, each rotor section having a set of salient rotor teeth projecting radially outward, the teeth in one rotor section being circumferentially offset from the teeth in the other rotor section by one-half tooth pitch so that the teeth define the rotor poles; and
a stator having four energizable stator poles terminating in stator shoes and with conductive windings around those energizable stator poles, and four passive inter-poles located uniformly between every adjacent pair of primary stator poles, the passive inter-poles lacking stator shoes and lacking any conductive windings,
wherein there are three pairs of rotor poles with a rotor tooth pitch angle of 120°, the motor characterized by a full step of 30° between successive one phase ON detent positions and by a half step of 15° between one-phase ON and two-phase ON detent positions.

* * * * *